Nov. 8, 1960 W. J. METZGER 2,959,299
COUPLING MECHANISM FOR RAILWAY VEHICLES
Filed Oct. 28, 1957 2 Sheets-Sheet 1

INVENTOR.
WILLIAM J. METZGER
BY Henry Kozak
ATTORNEY

United States Patent Office 2,959,299
Patented Nov. 8, 1960

2,959,299

COUPLING MECHANISM FOR RAILWAY VEHICLES

William J. Metzger, East Cleveland, Ohio, assignor to National Malleable and Steel Castings Company, Cleveland, Ohio, a corporation of Ohio Filed Oct. 28, 1957, Ser. No. 692,652

4 Claims. (Cl. 213—112)

The present invention relates to a coupling device suitable for coupling the railway vehicle on which it is mounted to another vehicle which may be equipped with one of a plurality of types of couplers.

The present invention is particularly useful, for example, on the locomotives of track systems wherein some cars are equipped with a different type of coupler than other cars. Usually, this situation is present in a system wherein a gradual rather than a rapid transition from one type of equipment to another is being effected in order that a reasonable service life may be realized on the equipment being replaced. It is usually desirable to equip some of the cars, as well as the locomotives, with the coupling mechanism herein described in order that mixed trains may be formed.

Important objects of the invention are: to provide a coupling device for use on railway vehicles that is capable of being coupled with more than one type of coupler; to provide the device in a form in which it may be quickly and conveniently changed from one adjustment to another for use with different types of couplers; to provide a coupling adapted for emergency towing operations; to construct the coupling device with means to lock either coupling facility thereof in an inoperative position while the other is in use; to provide a transition-type coupling device which utilizes conventional structure for connecting it to the car on which it is mounted; to facilitate eventual equipping of the vehicle with a post-transition type of coupler; to provide a plural-coupler coupling device whereby draft force may be transmitted centrally through the bearing connection of the device and the associated railway vehicle; and to provide a transition-type coupling device permitting the use of a striker plate suitable for use with a post-transition or conventional type of coupler.

To achieve such objects, the present invention is provided as a coupling device comprising a plurality (preferably two) unlike couplers connected in end-to-end pivoted relationship. Coupling means is carried on the forward end of each coupler adapting the device for alternate or noncontemporaneous connection of each coupling means with that on an opposing vehicle. The device may be used to replace the conventional coupler at either or both ends of a railway vehicle. One of the couplers occupies an operative position that is rearward, with respect to the other, and provides, at its rearward end portion, means adapting the device to be pivotally connected with a railway vehicle by, for example, a pivot pin. The forward portion of each coupler of the device comprises means adapting it to be coupled with another coupler. To render the rearward coupler of the device operative as a coupler, the forward coupler swings to a relatively angled position to expose its coupling means for engagement with another coupler. In a preferred embodiment, the forward coupler may be locked in its angled position, or its operative position.

The invention is described in further detail with reference to the drawing, in which.

Figure 1:
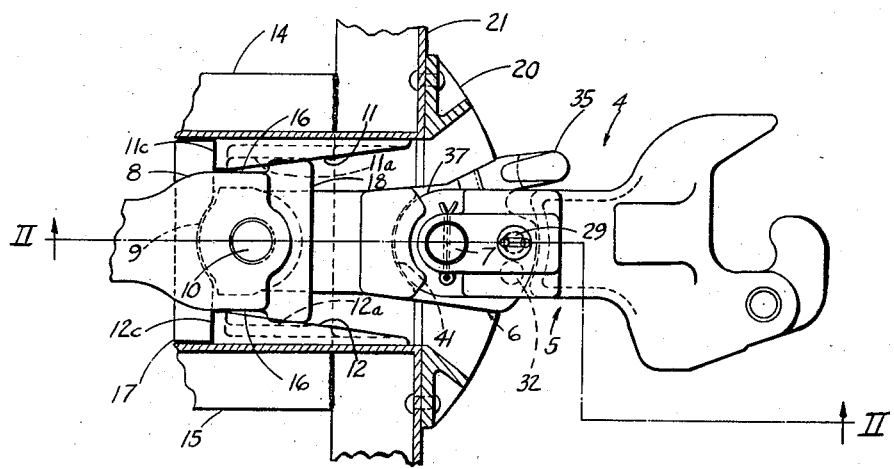
Fig. 1 is a plan view illustrating the coupling device of the invention in its entirety, and portions of an associated vehicle connected therewith.

The coupling device 4 comprises a front coupler 5 and a rear coupler 6 connected in end-to-end pivotal relationship by a pin 7. The device is connected by the shank 9 of the coupler 6 to a yoke 8 of a conventional draft gear (not fully shown) by a pivot pin 10. Cleats 11 and 12, mounted along the inner sides of the center sill members 14 and 15, provide forward stopping lugs 11c and 12c for the draft gear. These lugs engage lateral surfaces 16 of the forward portion of the yoke 8.

The rear coupler 6 has its rearwardmost, partially spherical surface 9a in engagement with a front recessed surface of the forward follower 17 of the draft gear. By this arrangement, buffing forces are transmitted directly from the device 4 to the draft gear cushion. The yoke 8 has a forward transverse guide portion 18 which, except for small clearances at the ends thereof adjacent cleats 11 and 12, extends from the surface 11a of cleat 11 to the surface 12a of cleat 12. During the application of buffing or draft forces, yoke portion 18 moves lengthwise of these guide surfaces to prevent lateral deviation in the movement of the yoke.

Figure 2:
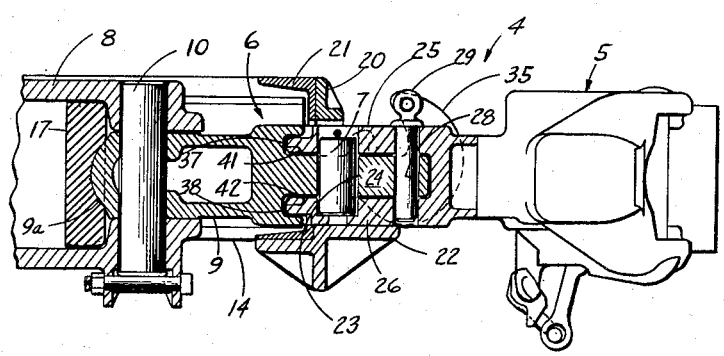
Fig. 2 is an elevation of the apparatus of Fig. 1 partly in section along the central vertical longitudinal plane of the device.

As shown in Figs. 1 and 2, couplers 5 and 6 are aligned in the manner of cooperating links of a chain for use of the coupler 5 as the active coupling agent; i.e., the axes of the couplers are in common alignment with the draft axis of the device as a whole. In addition to support provided within the front end of the yoke at the pin 10, the device is further supported by a striking plate 20 mounted on the front face of the channel 21, the latter being secured, as by welding, across the ends of the sill channels 14 and 15. The channel 21 and the striking plate 20 have coinciding openings through which the device extends. In supporting the device 4, a forwardly-extending shelf or lip 22 of the striking plate engages the undersurface of the coupler 5 just forwardly of the pivot axis provided by the pin 7.

The pivot joint of the two couplers is formed by a forwardly-extending apertured tongue portion 24 of the coupler 6 extending into close clearance with the inner surfaces of legs 25 and 26 of the rearward bifurcate portion of the coupler 5. Preferably, the clearance of the tongue with the legs is merely sufficient to provide free movement of one coupler relative to the other. The legs 25 and 26 are provided with openings in registry with an opening 23 through the tongue to accommodate the pin 7. The tongue 24 extends sufficiently forwardly of its opening 23 to provide another opening 28 in registry with openings of like bore in the legs 25 and 26 to receive a lock pin 29. The tongue 24 is provided with another opening 32 at the same radial distance from the pin 7 as the opening 28 to permit the coupler 5 to be swung to an angled position wherein it is locked out of in-line alignment relative to the rearward coupler by insertion of the pin through the leg openings of coupler 5 and the opening 32 of coupler 6.

Figure 3:
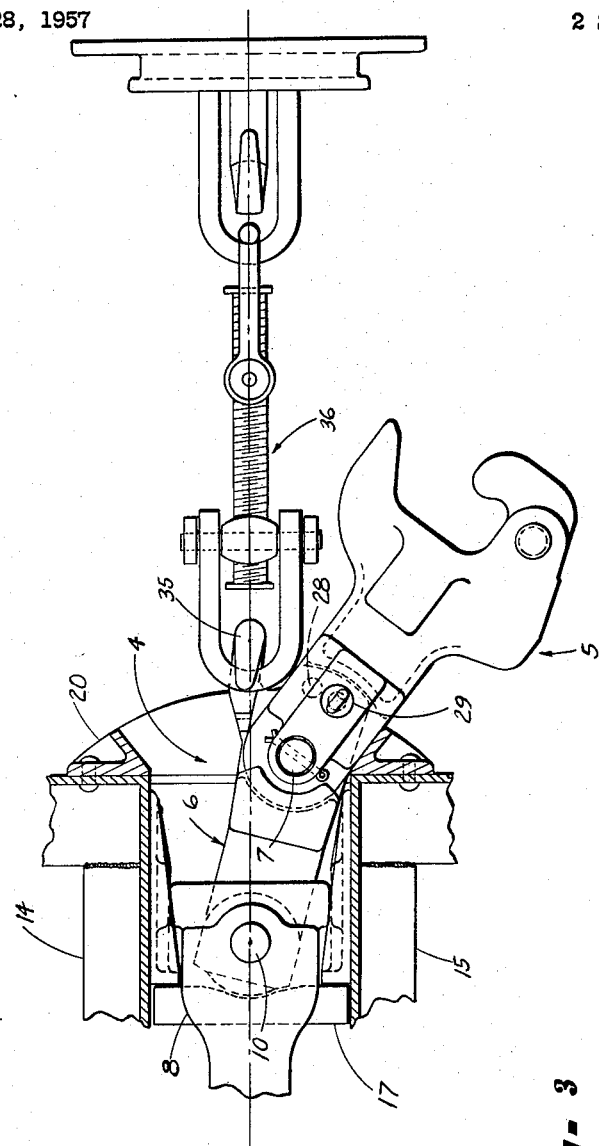
Fig. 3 is a plan view of the device of Figs. 1 and 2, showing one of the couplers thereof connected with the coupler of another vehicle.

Movement of the coupler 5 to the angled position exposes a hook 35 of the coupler 6 whereby it may be readily connected with coupling means such as a turnbuckle 36. As the hook 35 is laterally offset with respect to the longitudinal axis of the coupler 6, i.e., the axis extending through the axes of pins 7 and 10, the coupler 6 is normally shifted in service (see Fig. 3) to an alignment wherein the draft axis of adjacent cars extends through the pin 10, the hook 35, and the coupling of the adjacent car coupled therewith. Consequently, the unused forward coupler 5 is shifted still further to one side of the draft axis of the cars to place it completely out of interference with the coupling system requiring the use of coupler 6, particularly when the coupler 5 is held rigidly in an angled position by the pin 29.

As a further feature of the device 4, the legs 25 and 26 of the coupler 5 terminate rearwardly as arcuate flanges 37 and 38 which are received in complementary arcuate grooves 41 and 42, respectively, formed within the coupler 6 adjacent each side of the tongue 24 thereof at close clearance with the flanges 37 and 38. Because of the relatively small clearances provided between the legs for the tongue 24, and the small clearances maintained in the grooves 41 and 42 with the flanges 37 and 38, the overlapping end portions of the couplers 5 and 6 are normally in substantial and loose frictional engagement. Thus, the surfaces defining these clearances receive much of the stress and wear that would be otherwise imposed on the pin 7 and the bearing surfaces of both couplers in engagement therewith. Thin clearances between these overlapping surfaces also rigidify the device in a direction parallel to the axis of the connecting pin 7. Wear in the connection of the couplers is further reduced by supporting the device along the undersurface of the coupler 5 upon the lip 22.

The elements forming the connection of the draft gear and the coupling device, i.e., the yoke, the butt-end of the shank of coupler 6, and the pivot pin 10, may be of conventional design, as shown, and are of the type ordinarily used in conventional coupling systems. The need for modification of such elements is avoided primarily through the disposition of the coupling members of the device in tandem, relatively-pivotal relationship. Use of a conventional connection of the device with the draft gear permits maximum bearing values and serviceability at this point in the vehicle. Another benefit resulting from the tandem design of the device is that this device may be used with striking plates adapted for use with conventional single-type couplers.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A coupling device for railway vehicles comprising: a pair of unlike couplers in tandem relationship having adjacent end portions in overlapping relationship; means pivotally connecting said end portions with respect to a normally vertical pivot axis extending therethrough restricting the couplers to relative angling movement in a plane normal to said axis; one of said couplers having an end portion longitudinally opposite its overlapping end portion comprising means aligned along an axis parallel to said pivot axis for connection to cooperating pivot means on a railway vehicle and aligned along a vertical axis whereby said one coupler may pivot in a horizontal plane relative to the vehicle; said one coupler comprising coupling means in adjacent laterally offset relation with the overlapping end portion thereof; the other coupler having an end portion longitudinally opposite its overlapping end portion comprising a second coupling means; each of said coupling means arranged for non-contemporaneously receiving an opposing coupler from the same general direction; said other coupler being pivotable to an angled position relative to said one coupler to dispose the first-named coupling means in exposed spaced relation with said other coupler in position for coupling.

2. The coupling device of claim 1 wherein: said overlapping end portions are comprised of an elongate tongue of one coupler extending between two elongate legs of a bifurcate end portion of the other coupler; and said legs and the tongue have aligned openings containing a pin about which one coupler may pivot relatively to the other.

3. The coupling device of claim 1 wherein: said overlapping end portions are comprised of a tongue of one coupler extending between two legs of a bifurcate end portion of the other coupler; and said legs and the tongue have two groups of openings aligned along parallel axes, one group contains a pin about which one coupler may pivot relatively to the other, the other group is adapted to receive a pin for locking the couplers against relative movement.

4. The coupling device of claim 1 wherein: said overlapping end portions are comprised of a tongue of one coupler extending between the two legs of a bifurcate end portion of the other coupler; each of said legs terminating in an arcuate flange of thinner cross-section than the associated leg, each flange extending into a generally complementary groove of the other coupler adjacent the base of its tongue.

References Cited in the file of this patent

UNITED STATES PATENTS

| | | |
|---|---|---|
| 1,580,623 | Metzger et al. | Apr. 13, 1926 |
| 1,605,414 | Willison | Nov. 2, 1926 |
| 1,661,246 | Wolfe | Mar. 6, 1928 |
| 1,958,316 | Richards | May 8, 1934 |
| 2,682,340 | Kayler | June 29, 1954 |